Patented Mar. 20, 1923.

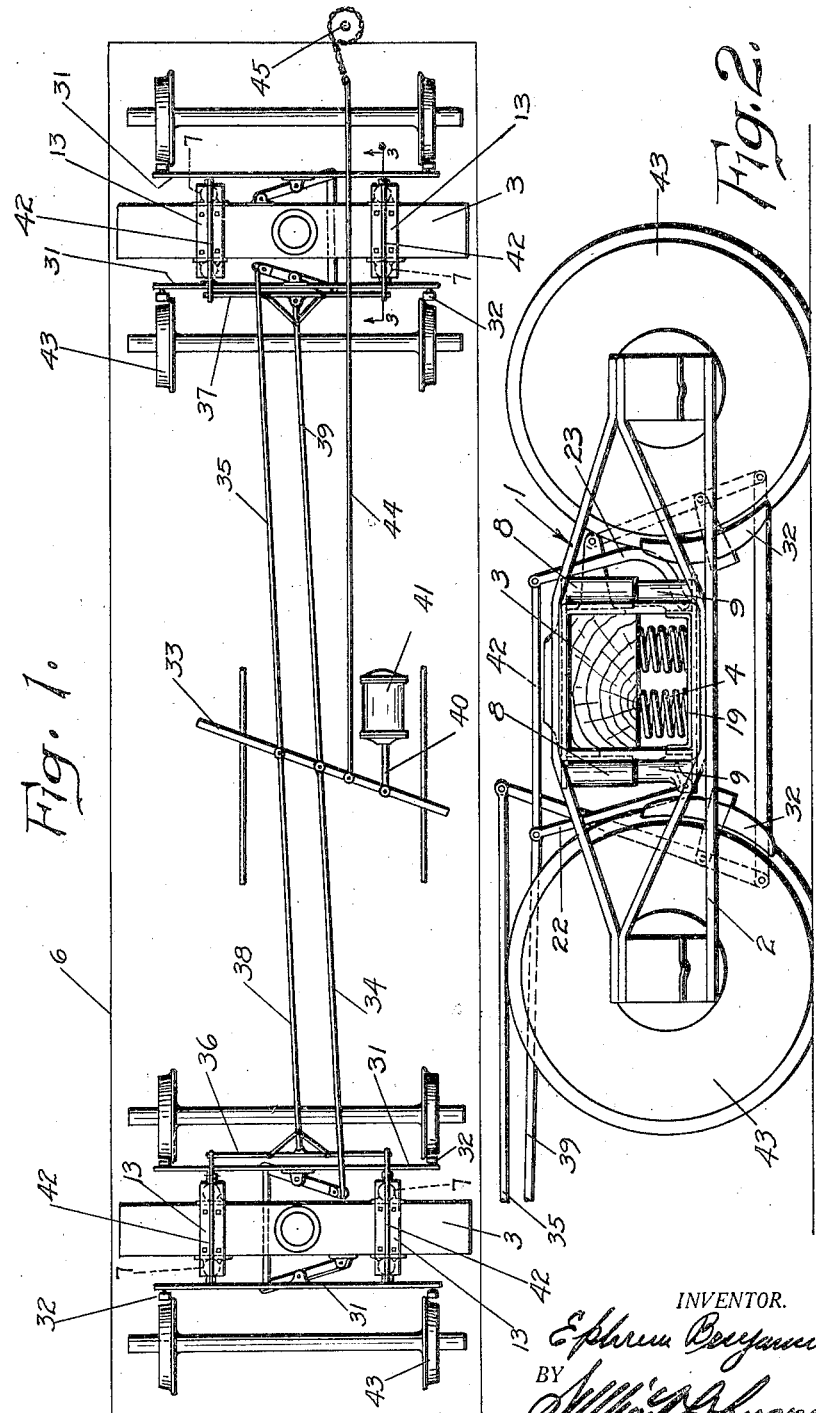
Mar. 20, 1923.
E. BENJAMIN
FLUID OPERATED BRAKE
Filed Sept. 23, 1920
1,448,908
2 sheets-sheet 1

1,448,908

UNITED STATES PATENT OFFICE.

EPHREM BENJAMIN, OF DENVER, COLORADO.

FLUID-OPERATED BRAKE.

Application filed September 23, 1920. Serial No. 412,311.

*To all whom it may concern:*

Be it known that I, EPHREM BENJAMIN, a citizen of the United States, residing at Denver, in the county of Denver and State of Colorado, have invented new and useful Improvements in Fluid-Operated Brakes, of which the following is a specification.

The present invention is directed to improvements in fluid operated brakes, and while more particularly designed for use on railways, it will be of course obvious that it is not necessarily limited thereto.

One of the primary objects of the invention is to provide a brake of this nature wherein the brakes will be applied by the weight of the cars whether the same are loaded, partly loaded, or empty.

Another object of the invention is to provide means whereby the air is utilized to positively hold the brake shoes in their released positions, but the same can be instantly applied when the pressure in the brake line is reduced, the application of the brakes being governed by the weight of the cars.

A still further object of the invention is to provide a braking system so constructed that the brake shoes will engage the wheels at pressures governed by the weight of the respective cars, thus eliminating the objectionable "flat wheels" which, under the present system, are occasioned by the brakes being applied to such an extent that the wheels are compelled to slide on the rails.

With these and other objects in view, this invention resides in the novel features of construction, formation, combination and arrangement of parts to be hereinafter more fully described, claimed and illustrated in the accompanying drawings, in which:

Figure 1 is a top plan view of the device, showing the same applied to a car, the body of the car being shown in outline.

Figure 2 is a side elevation of a truck equipped with the device.

Figure 3:
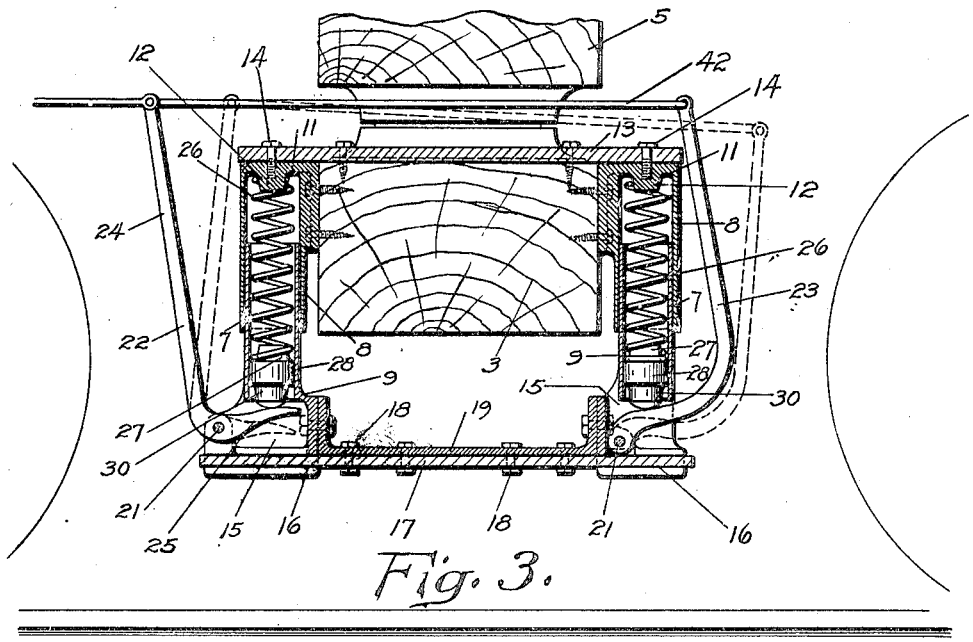
Figure 3 is a sectional view on line 3—3 of Fig. 1.
Figure 4:
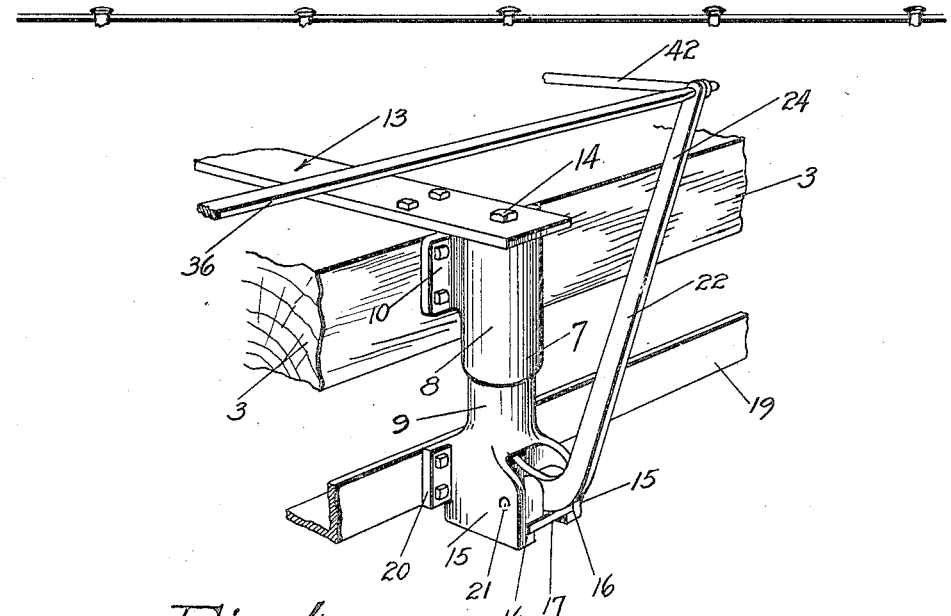
Figure 4 is a perspective view of one of the casings.

Referring to the drawings, 1 designates the truck which comprises the usual side frames 2, and bolster 3, the latter having its ends supported by the usual coil springs 4. This bolster is pivotally connected to the bottom transoms 5 of the car 6 in the customary manner.

The bolster 3 of each truck has associated therewith casings 7, which are arranged in pairs, and located adjacent the respective ends of the bolsters, the casings of each pair being preferably arranged on opposite sides of the bolster, as shown in Fig. 3 of the drawings.

Each casing consists of telescoping hollow sections 8 and 9, the former having flanges 10 formed integral therewith, whereby they may be firmly secured to the sides of the bolsters 3 by suitable securing devices. The upper ends of the sections 8 have tops 11, which are provided interiorly with bosses 12, the purpose of which will appear later.

In order to brace the sections 8 bars 13 are secured transversely of the bolsters 3, and have their ends bolted to the tops 11 of the respective sections, as at 14.

The lower sections 9 of the casings 7, which are slidably received within the sections 8 are open at both top and bottom, and have their lower ends terminating in furcations 15. The confronting faces of these furcations are formed with diametrically disposed grooves 16 in which are engaged the ends of the brace bars 17, said bars being bolted, as at 18, transversely of the usual sand-boards 19 of the trucks. The furcations are additionally secured to the sand-boards 19 through the medium of the wings 20 formed integral therewith.

Transverse pins 21 are supported by the furcations 15 of each section 9 of the casings, and pivotally connected thereto are bell-crank levers 22 and 23. These levers are substantially the same shape, and function in the same manner, but it will be observed that the levers 22 are pivoted to their associated pins 21 adjacent the junction of the vertical arms 24 and horizontal arms 25, whereas the levers 23 have their inner ends pivotally connected with their associated pins 21.

Mounted in the casings 7 are coil springs 26, the same being centered at their upper ends by the bosses 12, while the lower ends thereof engage the bosses 27 carried by the upper ends of the heads 28. These heads are slidably mounted in the casing sections 9, and have their lower ends formed with rounded lugs 30 which bear on the adjacent horizontal arms 25 of the respective levers 22 and 23, and are capable of slight relative sliding movement therewith.

The brake beams 31 carrying the brake shoes 32 are suspended with respect to the bolsters 3 in the conventional manner, and are connected to the usual equalizing bar 33, which is also of the conventional form and arrangement.

Extending longitudinally of the inner brake beams 31 are bars 36 and 37, said bars being connected respectively to the equalizing bars 33 by rods 38 and 39. The equalizing bar 33 has one end connected to the piston rod 40 of the air cylinder 41, and in this instance the piston rod 40 operates in a direction reverse to the usual method, the purpose of which will appear later.

Each bar 36 and 37 is pivotally connected with the upper ends of the levers 22 and 23 through the medium of links 42. Thus it will be seen that the links 42 and levers 22 and 23 are compelled to move in unison.

When the different elements are in the positions as shown in Fig. 1 of the drawings, the piston rod 40 is acting on the equalizing bar 33 to positively hold the brake shoes 32 from engagement with the wheels 43. Upon air exhausting from the cylinder 41, the bar 33 will be oscillated to force the rods 34 and 35 in opposite directions, thus causing the brake shoes to approach the wheels 43 to engage the same, as desired. The rods 38 and 39 are shifted simultaneously with the rods 34 and 35, and also in opposite directions through the medium of the bar 33. As the rods 38 and 39 are shifted it is obvious that the links 42 connecting the upper ends of the bell-crank levers 22 and 23 will be shifted, and as the rods 38 and 39 move in opposite directions the levers 22 and 23 will be moved to the positions as shown in full lines in Fig. 3 of the drawings. When in this position the springs 26 will be under tension, and will remain under a predetermined tension as long as the brake shoes 32 are not applied.

As soon as the pressure in the usual air line is reduced the piston 40 will shift, and the springs 26 will instantly expand, thereby rocking the levers 22 and 23 to the positions shown in dotted lines in Fig. 3 of the drawings, whereupon the links 42 and the rods 38 and 39 will shift, and against the action of the usual rods 34 and 35, thus moving the same in directions to swing the brake beams so that the shoes thereof will engage the wheels, thereby applying the brakes.

Thus it will be seen that the springs 26, which will be under tension with the lightest load, will effectively brake the associated cars, as well as when a car is partly, or heavily loaded. This is essential, since an empty car does not require the same braking power as a more heavily loaded one. A heavily loaded car will compress the springs 26 to a greater degree than one empty, or partly loaded, since the weight of the car naturally exerts more pressure on the bolster springs 4, as well as on the springs 26, but it will be apparent that no matter what the load of the car is, the springs 26 will instantly expand as soon as the pressure in the train line is reduced, thereby quickly and effectively applying the brakes.

From the foregoing, it is thought that the construction, operation and many advantages of the herein described invention will be apparent to those skilled in the art, without further description, and it will be understood that various changes in shape, proportion and minor details of construction may be resorted to without departing from the spirit or sacrificing any of the advantages of the invention.

In Fig. 1 there is shown the usual link 44, the inner end of which is connected with the equalizing bar 33, while the outer end is flexibly connected to the hand brake staff 45. The operation of the hand brake will be the same as applying the air to the cylinder.

What is claimed is:

1. In a brake of the class described, the combination with a car and its trucks, levers pivotally associated with the trucks, yieldable means carried by the truck bolsters for co-operating directly with the levers, said yieldable means being controlled by the weight of the associated car to apply the brakes.

2. In a brake of the class described, the combination with a car and its trucks, sectional casings associated with the trucks, levers pivotally associated with the casings, and springs located in the casings for co-operating with the levers, as and for the purpose set forth.

3. In a brake of the class described, the combination with a car and its trucks, casings consisting of telescoping sections connecting the truck bolsters and sand boards, and springs located in the casings for co-operating with the levers, said levers being pivotally connected with the sand boards, as and for the purpose set forth.

4. In a brake of the class described, the combination with a car and its trucks, casings consisting of telescoping sections, each section being connected respectively with the truck bolsters and sand boards, levers pivotally connected with certain of the sections, and springs located in the casings and co-operating with the levers, as and for the purpose set forth.

In testimony whereof I have hereunto set my hand in presence of two subscribing witnesses.

EPHREM BENJAMIN.

Witnesses:
 HARRY B. TEDROW,
 ARTHUR M. GARDNER.